Dec. 30, 1930.  R. T. PIERCE  1,786,778
SWITCH MECHANISM
Filed Feb. 14, 1928
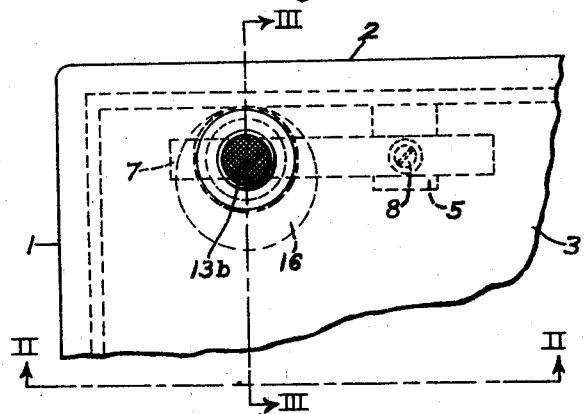
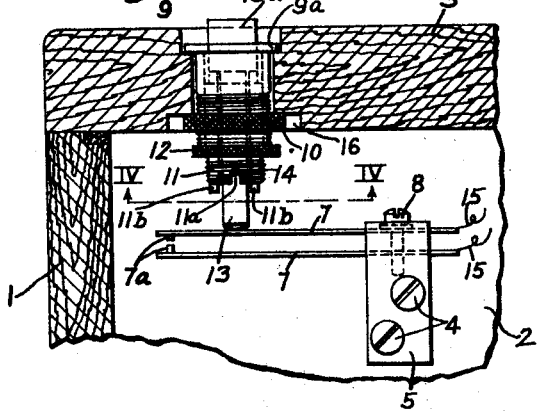
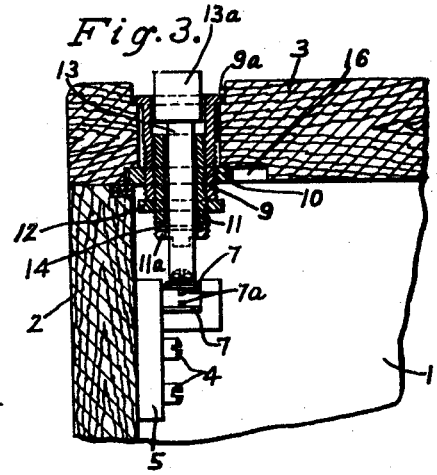
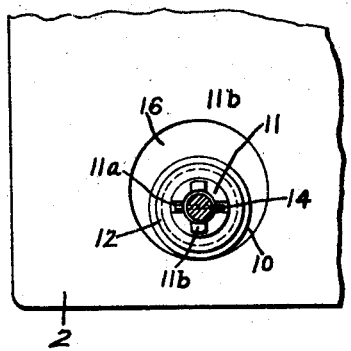
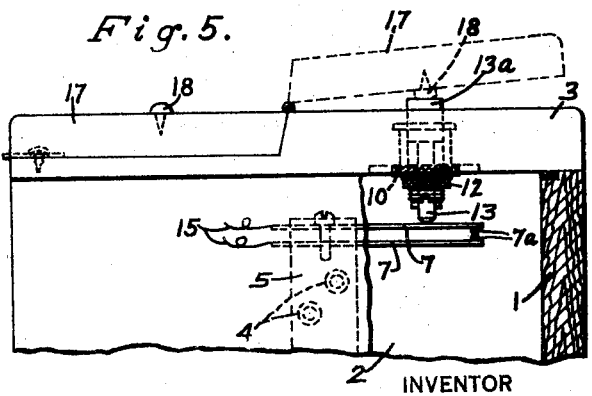
INVENTOR
Raymond T. Pierce
BY
*Wesley G. Carr*
ATTORNEY Patented Dec. 30, 1930

1,786,778

UNITED STATES PATENT OFFICE

RAYMOND T. PIERCE, OF MILBURN, NEW JERSEY, ASSIGNOR TO WESTINGHOUSE ELECTRIC & MANUFACTURING COMPANY, A CORPORATION OF PENNSYLVANIA

SWITCH MECHANISM

Application filed February 14, 1928. Serial No. 254,246.

My invention relates to switch mechanisms and has particular reference to an arrangement utilizable for connecting the actuating coil or winding of an electrical measuring instrument to an electrical circuit, and more particularly, the actuating coil of a voltmeter or the potential coil of a wattmeter.

In accordance with my invention, the actuating rod or member of a switch extends through the cover of a meter casing and is so positioned that engagement may be effected therewith by a part of the meter cover when the latter is moved to a position exposing the meter scale.

Further in accordance with my invention, the aforesaid actuating rod or member is supported for longitudinal movement in a member longitudinally adjustable in a passage extending through the cover of a meter casing.

My invention resides in the mechanism and features of construction of the character hereinafter described and claimed.

For an illustration of one of the forms my apparatus may take, reference is to be had to the accompanying drawing in which:

Figure 1 is a plan view of portions of a meter casing with which my switch mechanism is utilizable.

Fig. 2 is a side elevational view of a switch constructed in accordance with my invention.

Fig. 3 is an end elevational view of the switch shown in Fig. 2.

Fig. 4 is a bottom view of the switch shown in Fig. 2, and

Fig. 5 is a side elevational view, partly broken away, of a meter casing by and in which my novel type of switch may be supported.

Referring to the drawings, there is illustrated the rear wall 1, a side wall 2, and the top wall or cover 3 of a housing or casing such, for example, as is illustrated in my copending application Serial No. 254,244, filed February 14, 1928, for the reception of apparatus utilizable for measuring an electrical quantity.

Suitably secured, as by screws 4, to the side wall 2 is a bracket or support 5 formed, in the example shown, of suitable insulating material, as hard rubber or a phenol condensation product. Disposed in spaced and insulated relation in a channel or recess in the bracket 5 are the members 7, 7 suitably secured to said bracket 5, by a screw 8, or the like. The members 7, 7 should be constructed of sheet-like resilient, conductive material, as phosphor bronze and, at or adjacent one end, each comprises a laterally extending contact point 7a, Figs. 2 and 3, formed preferably of silver.

Disposed in a passage extending through the cover 3 in vertical alignment with the members 7, 7, as viewed in Fig. 3, is an exteriorly and interiorly threaded sleeve 9, preferably of metallic material and having a flanged extremity 9a disposed upon a ledge formed in the wall defining the aforesaid passage. A nut 10 threaded to the sleeve 9 secures the sleeve 9 to the cover 3. Passing interiorly of sleeve 9 and threaded thereto is a cylindrical member 11 having a clamping nut 12 disposed exteriorly thereof. The end of member 11 projecting into the space defined by the aforesaid walls 1, 2 and 3 is transversely slotted as indicated at 11a and provided with one or more lugs or projections 11b.

Passing through the sleeve 9 and member 11, and freely rotatable within the latter, is an actuating member or rod 13 formed preferably of hard rubber or a phenol condensation product. Member 13 comprises an enlarged head 13a, the outer or upper surface of which should be knurled as indicated at 13b, Fig. 1. Extending transversely through the member 13 is pin 14, formed preferably of metallic material and adapted, at times, to rest within the slot 11a.

Connected to the members 7, 7 are conductors 15 leading to one or more coils or windings, not shown, by which the deflecting or indicating member of the meter is actuated, all as illustrated more particularly in my aforesaid application Serial No. 254,244, filed February 14, 1928.

It is desirable that the lower face of cover member 3 be provided with a recess 16 permitting ready manipulation of the nuts 10 and 12, both of which preferably are provided with exteriorly knurled or roughened surfaces. If desired, recess 16 may be eccentrically disposed with respect to the longitudinal axis of the passage receiving sleeve 9, for otherwise a part of said recess would be covered by the side wall 2.

Preferably, the flanged extension 9a of sleeve 9 is disposed some distance below the upper surface of cover 3 so that the knob 13a may be freely accessible for manual operation, even though it be in its depressed position.

With the parts positioned as indicated in Figs. 2 and 3, member 13, at its lower end, contacts with the upper resilient member 7 and is biased upwardly thereby. Should the member 13 be in the proper rotated position, pin 14 will fall within the slot 11a, the wall defining said slot limiting upward movement of said member 13. When the parts are in this position, contact members 7a, 7a should be disengaged, thereby opening the circuit of the coil or winding connected to the members 7, 7. Upon depression of member 13, as by manual engagement with the knurled surface 13b, the upper member 7 is moved toward the lower member 7, thereby bringing the contact points 7a, 7a into engagement and closing the circuit through said coil or winding. By slightly rotating the member 13, pin 14 will be moved from its aligned position with respect to slot 11a toward or into engagement with lugs 11b and, consequently, upon removal of pressure from said knurled surface 13b, normal upward movement of the member 13 is prevented, thereby maintaining the circuit including said coil or winding in closed condition.

Ordinarily, for a purpose hereinafter described, it is desirable, when the members 7a, 7a are disengaged, as illustrated in Figs. 2 and 3, that the upper surface of knob 13a extend somewhat above the upper surface of cover 3 and the parts are designed with this end in view. Member 11 may be moved in either direction longitudinally of sleeve 9 so that member 13, when fully depressed, places the spring members 7 under the proper degree of tension and effects the proper contacting relation between the tips 7a. It will be observed that the upper surface of member 11 forms a stop for limiting, by coaction with the bottom surface of member 13a, the downward movement of member 13.

Referring to Fig. 5, there is illustrated a meter box or casing with which the aforesaid switching mechanism may be associated. The cover 3 comprises a swinging or hinged section 17 which, when moved to the position indicated by the broken lines in Fig. 5, exposes the meter dial and indicating member. Carried by the member 17 is a projection or knob 18 of hard rubber, a phenol condensation product, or the like. With the section 17 in the position indicated by said broken lines in Fig. 5, the knob 18 engages the knob 13a of member 13 and, therefore, said section 17 may be manually depressed to transmit movement to member 13 and close the contact points 7a, 7a upon each other.

It shall be understood that switch mechanism of the character herein illustrated may be utilized otherwise than in connection with metering apparatus or a meter box, and that the conductors 15 may be included in a circuit other than the actuating circuit of a meter.

I claim as my invention:

1. The combination with a supporting member having a passage, of a switch-actuating member disposed in said passage and movable longitudinally thereof, and a sleeve carried by said supporting member and within which said actuating member is disposed, said sleeve terminating interiorly of said passage.

2. The combination with a supporting member having a passage, of a switch-actuating member disposed in said passage and movable longitudinally thereof, and a sleeve carried by said supporting member and within which said actuating member is disposed, said sleeve comprising a flanged extremity disposed interiorly of said passage.

3. The combination with a supporting member having a passage, of a sleeve disposed in said passage, a cylindrical member disposed entirely within the outer limit of said passage and carried within said sleeve, and adjustable longitudinally thereof, and a switch-actuating member movable longitudinally of said cylindrical member.

4. The combination with a supporting member having a passage, of a sleeve disposed in said passage, a cylindrical member disposed entirely within the outer limit of said passage within said sleeve and adjustable longitudinally thereof, means for retaining said cylindrical member in an adjusted position, and a switch-actuating member movable longitudinally of said cylindrical member.

5. The combination with a supporting member having a passage, of a sleeve disposed in said passage, a cylindrical member disposed within said sleeve and adjustable longitudinally thereof, means comprising a lock nut coacting with said sleeve for retaining said cylindrical member in an adjusted position, and a switch-actuating member movable longitudinally of said cylindrical member.

6. The combination with a supporting member having a passage, of a sleeve disposed in said passage, a cylindrical member having a uniform outer diameter disposed within said sleeve, and a switch-actuating member movable longitudinally of said cylindrical member, said cylindrical member limiting movement of said switch-actuating member in one direction.

7. The combination with a supporting member having a passage, of a sleeve disposed in said passage, a cylindrical member having a uniform outer diameter disposed within said sleeve, and a shouldered switch-actuating member movable longitudinally of said cylindrical member, the shoulder of said switch-actuating member coacting with said cylindrical member and limiting movement of said switch-actuating member in one direction.

8. The combination with a supporting member having a passage, of a sleeve disposed in said passage, a cylindrical member of uniform outer diameter threaded interiorly of said sleeve, and a switch-actuating member movable longitudinally within said cylindrical member.

9. The combination with a supporting member having a passage, of a sleeve disposed in said passage, a nut threaded to said sleeve and coacting with said supporting member, a cylindrical member threaded within said sleeve, a nut threaded to said cylindrical member and coacting with said sleeve, and a switch-actuating member disposed interiorly of said cylindrical member.

10. The combination with a supporting member having a passage, of a sleeve disposed in said passage, a nut threaded to said sleeve and coacting with said supporting member, a cylindrical member threaded within said sleeve, a nut threaded to said cylindrical member and coacting with said sleeve, said supporting member comprising a recess for ready manipulation of said nuts, and a switch-actuating member disposed interiorly of said cylindrical member.

11. The combination with a supporting member having a passage, of a cylindrical member disposed in said passage, and comprising a slot at one end, an actuating member movable longitudinally and rotatably in said cylindrical member, a switch member with which said actuating member coacts, a transverse pin in said actuating member, and means for preventing rotation of said actuating member beyond a predetermined position.

12. The combination with a supporting member having a passage, of a cylindrical member disposed in said passage, and comprising a slot at one end, an actuating member movable longitudinally and rotatably in said cylindrical member, a switch member with which said actuating member coacts, a transverse pin in said actuating member, and means comprising a lug extending from said cylindrical member, for preventing rotation of said actuating member beyond a predetermined position.

13. The combination with a supporting member having a passage, of a sleeve disposed in said passage, a cylindrical member entirely within the outer limit of said passage threaded within said sleeve for longitudinal adjustment relative thereto, means for locking said member in any adjusted position, and a switch-actuating member movable longitudinally within said cylindrical member.

In testimony whereof, I have hereunto subscribed my name this 6th day of Oct., 1927.

RAYMOND T. PIERCE.